United States Patent
Slettnes et al.

(10) Patent No.: US 9,984,302 B2
(45) Date of Patent: May 29, 2018

(54) METHODS AND SYSTEMS FOR DETECTION OF A CONSUMABLE IN A SYSTEM

(71) Applicant: LIFE TECHNOLOGIES CORPORATION, Carlsbad, CA (US)

(72) Inventors: Tor Slettnes, Castro Valley, CA (US); Sylvia H. Chang, Fremont, CA (US); Swati Goyal, San Mateo, CA (US); David Comstock, San Jose, CA (US)

(73) Assignee: LIFE TECHNOLOGIES CORPORATION, Carlsbad, CA (US)

( * ) Notice: Subject to any disclaimer, the term of this patent is extended or adjusted under 35 U.S.C. 154(b) by 110 days.

(21) Appl. No.: 14/893,360

(22) PCT Filed: May 22, 2014

(86) PCT No.: PCT/US2014/039236
§ 371 (c)(1),
(2) Date: Nov. 23, 2015

(87) PCT Pub. No.: WO2014/190205
PCT Pub. Date: Nov. 27, 2014

(65) Prior Publication Data
US 2016/0110624 A1    Apr. 21, 2016

Related U.S. Application Data

(60) Provisional application No. 61/827,500, filed on May 24, 2013.

(51) Int. Cl.
*G06K 9/00* (2006.01)
*G06K 9/18* (2006.01)
(Continued)

(52) U.S. Cl.
CPC ......... *G06K 9/3266* (2013.01); *G06K 7/1439* (2013.01); *G06K 9/34* (2013.01); *G06K 2009/3291* (2013.01)

(58) Field of Classification Search
None
See application file for complete search history.

(56) References Cited

U.S. PATENT DOCUMENTS 4,907,283 A * 3/1990 Tanaka .............. G06F 17/30253
382/176
5,091,968 A * 2/1992 Higgins ............... G06K 9/6202
382/137

(Continued)

FOREIGN PATENT DOCUMENTS

WO    2013049442 A1    4/2013

OTHER PUBLICATIONS

Lin et al. (Real-time automatic recognition of omnidirectional multiple barcodes and DSP implementation, Oct. 2010 Springer-Verlag).*

(Continued)

*Primary Examiner* — Randolph I Chu
(74) *Attorney, Agent, or Firm* — Jones Robb, PLLC

(57) ABSTRACT

A computer-implemented method for detecting a presence of an object-of-interest in a system is provided. The method includes imaging the first object-of-interest including an identifier, wherein the imaging generates a first set of image data and determining the portion of the image data including the identifier based on a predetermined location. The method further includes dividing the portion of the image data including the identifier into at least two segments Next, the presence of the object-of-interest is determined by determining if intensity values within each segment exceed a presence threshold.

21 Claims, 8 Drawing Sheets

(51) Int. Cl.
*G06K 9/32* (2006.01)
*G06K 7/14* (2006.01)
*G06K 9/34* (2006.01)

(56) References Cited

U.S. PATENT DOCUMENTS

| | | | | |
|---|---|---|---|---|
| 5,120,940 | A * | 6/1992 | Willsie | G06K 7/1443 235/462.08 |
| 5,367,578 | A * | 11/1994 | Golem | G06K 9/6202 382/183 |
| 5,768,441 | A * | 6/1998 | Yoshizawa | G06K 9/38 358/464 |
| 5,991,439 | A * | 11/1999 | Tanaka | G06K 9/32 358/402 |
| 6,744,938 | B1 | 6/2004 | Rantze et al. | |
| 6,807,286 | B1 * | 10/2004 | Krumm | G06K 9/6255 382/103 |
| 2010/0104130 | A1 * | 4/2010 | Harada | G06K 9/348 382/100 |
| 2011/0161140 | A1 * | 6/2011 | Polt | B60R 1/12 705/13 |
| 2013/0163811 | A1 * | 6/2013 | Oelke | G06K 9/46 382/103 |

OTHER PUBLICATIONS

Lyu et al. (A Comprehensive Method for Multilingual Video Text Detection, Localization, and Extraction, IEEE Transactions on Circuits and Systems for Video Technology, vol. 15, No. 2, Feb. 2005).*
International Search Report and Written Opinion in Application No. PCT/US2014/039236, dated Sep. 18, 2014.
Cheriet, Mohamed, et al., "Character Recognition Systems: A Guide for Students and Practitioners", Section 5.2, Jan. 1, 2007, pp. 1-9.
Fernando, Martin-Rodriguez, et al., "Digital Instrumentation Calibration Using Computer Vision", Section 2.4, Jun. 21, 2010, pp. 335-344.
Lu, Yi, "Machine Printed Character Segmentation—An Overview", vol. 28,. No. 1, Section 3.1, Jan. 1, 1995, pp. 67-80.

* cited by examiner

METHODS AND SYSTEMS FOR DETECTION OF A CONSUMABLE IN A SYSTEM

BACKGROUND

Generally, there is an increasing need to automate systems to increase efficiency. For example, advances in automated biological sample processing instruments allow for quicker, more efficient, and high throughput analysis of samples. These types of systems may assay a greater number of samples than previous systems. As such, samples undergoing various assays are labeled or marked with identifiers.

Previously, an operator of the system or instrument may have had to manually track and validate samples by reading the identifiers on sample containers, racks, or assay chips. This type of manual tracking and validation can be labor-intensive and include a high probability of operator error such as sample mistracking, or improper testing. Furthermore, the greater number of samples desired to be assayed would be more time intensive and cumbersome. In other systems, a system may not be able to begin a run until it is confirmed that a consumable has been properly loaded into the system.

Other more automated systems may scan for identifiers to track and validate samples before testing. However, these systems often need additional components. Furthermore, the identifiers may be misread or unreadable by the systems.

SUMMARY

A computer-implemented method for detecting a presence of an object-of-interest in a system is provided. The method includes imaging the first object-of-interest including an identifier, wherein the imaging generates a first set of image data and determining the portion of the image data including the identifier based on a predetermined location. The method further includes dividing the portion of the image data including the identifier into at least two segments and identifying the first object-of-interest based on the two identifiers. Next, the presence of the object-of-interest is determined by determining if intensity values within each segment exceed a threshold.

DETAILED DESCRIPTION

Figure 1:
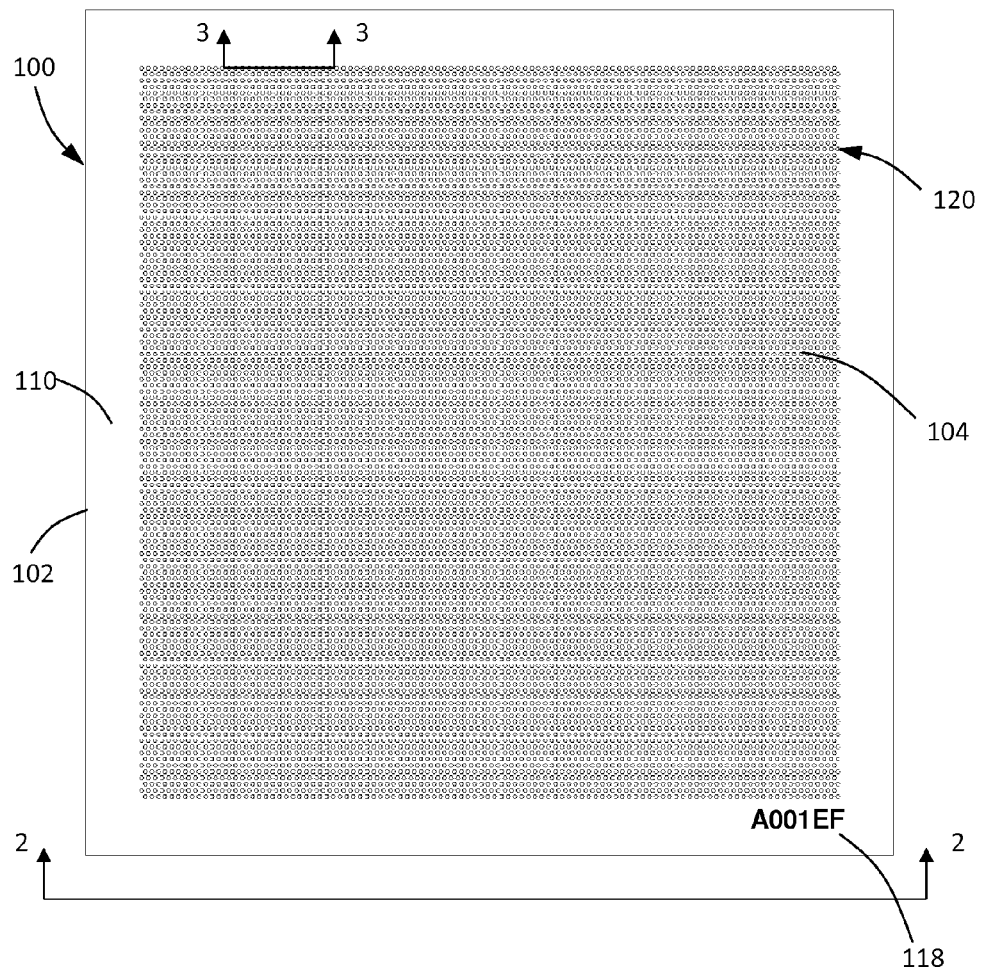
FIG. 1 illustrates a chip including a plurality of reaction sites according to various embodiments described herein.

To provide a more thorough understanding of the present invention, the following description sets forth numerous specific details, such as specific configurations, parameters, examples, and the like. It should be recognized, however, that such description is not intended as a limitation on the scope of the present invention, but is intended to provide a better description of the exemplary embodiments.

Detection of labeled consumable material is achieved using an algorithm to image data acquired from an optical reader, yielding a quick and highly accurate indication of whether such material is present. In its preferred embodiment, more rigorous analysis and identification of said consumable will be performed on the image data only after presence is confirmed, whereupon additional image acquisition and analysis will be performed on the consumable.

An optical reader ("instrument") is used to analyze chemical reactions within a consumable product ("chip"). Each chip is uniquely labeled, with the intent to provide the operator of said instrument a means to match the results of the analysis operation with the identity of the original consumable.

The instrument features a mechanical tray in which the chip is inserted, an illumination source ("light"), and a two dimensional optical detector ("camera") to capture images of the chip surface. Additionally, an embedded graphical user interface (eGUI) presents:

The presence/absence status of a consumable in the tray
The identity of said consumable
Controls to initiate image acquisition and primary analysis of consumable, if deemed present.

As described above, as the number of items a system needs to process are increased, a more automated system is desired. Furthermore, more accurate and efficient identification, tracking, validation, security, and checking for compatibility, for example, are also desired. As such, samples and assays are often labeled with machine-readable identifiers. Examples of identifiers could be alphanumeric characters, QR codes, RFID identifiers, or barcodes, for example.

The present application relates to utilizing identifiers to determine a presence of a consumable in a system. Detection of the presence of the consumable in the system may also indicate that the consumable is loaded properly. After detecting the presence of a consumable, the system may initiate a run or allow a user to initiate a run.

It should be recognized that the methods and systems described herein may be implemented in various types of systems, instruments, and machines. For example, various embodiments may be implemented in an instrument that performs polymerase chain reactions (PCR) on a plurality of samples.

According to embodiments described herein, a consumable including one or a plurality of samples within one or a plurality of reaction sites may be marked with at least one identifier.

In various embodiments, the devices, instruments, systems, and methods described herein may be used to detect one or more types of biological components of interest. These biological components of interest may be any suitable biological target including, but are not limited to, DNA sequences (including cell-free DNA), RNA sequences, genes, oligonucleotides, molecules, proteins, biomarkers, cells (e.g., circulating tumor cells), or any other suitable target biomolecule.

In various embodiments, such biological components may be used in conjunction with various PCR, qPCR, and/or dPCR methods and systems in applications such as fetal diagnostics, multiplex dPCR, viral detection and quantification standards, genotyping, sequencing validation, mutation detection, detection of genetically modified organisms, rare allele detection, and copy number variation. Embodiments of the present disclosure are generally directed to devices, instruments, systems, and methods for monitoring or measuring a biological reaction for a large number of small volume samples. As used herein, samples may be referred to as sample volumes, or reactions volumes, for example.

While generally applicable to quantitative polymerase chain reactions (qPCR) where a large number of samples are being processed, it should be recognized that any suitable PCR method may be used in accordance with various embodiments described herein. Suitable PCR methods include, but are not limited to, digital PCR, allele-specific PCR, asymmetric PCR, ligation-mediated PCR, multiplex PCR, nested PCR, qPCR, genome walking, and bridge PCR, for example.

As described below, in accordance with various embodiments described herein, reaction sites may include, but are not limited to, through-holes, wells, indentations, spots, cavities, sample retainment regions, and reaction chambers, for example.

Furthermore, as used herein, thermal cycling may include using a thermal cycler, isothermal amplification, thermal convection, infrared mediated thermal cycling, or helicase dependent amplification, for example. In some embodiments, the chip may be integrated with a built-in heating element. In various embodiments, the chip may be integrated with semiconductors.

According to various embodiments, detection of a target may be, but is not limited to, fluorescence detection, detection of positive or negative ions, pH detection, voltage detection, or current detection, alone or in combination, for example.

Various embodiments described herein are particularly suited for digital PCR (dPCR). In digital PCR, a solution containing a relatively small number of a target polynucleotide or nucleotide sequence may be subdivided into a large number of small test samples, such that each sample generally contains either one molecule of the target nucleotide sequence or none of the target nucleotide sequence. When the samples are subsequently thermally cycled in a PCR protocol, procedure, or experiment, the sample containing the target nucleotide sequence are amplified and produce a positive detection signal, while the samples containing no target nucleotide sequence are not amplified and produce no detection signal. Using Poisson statistics, the number of target nucleotide sequences in the original solution may be correlated to the number of samples producing a positive detection signal.

Consumable

In various embodiments, a consumable may have a plurality of sample regions, or reaction sites, configured for receiving a plurality of samples. Some examples of a sample holder may include, but are not limited to, a multi-well plate, such as a standard microtiter 96-well plate, a 384-well plate, a microcard, a through-hole array, or a substantially planar holder, such as a glass or plastic slide. The reaction sites in various embodiments of a sample holder may include depressions, indentations, ridges, and combinations thereof, patterned in regular or irregular arrays formed on the surface of the sample holder consumable.

According to various embodiments of the present teachings, each reaction site may have a volume of about 1.3 nanoliters. Alternatively, the volume each reaction site may be less than 1.3 nanoliters. This may be achieved, for example, by decreasing the diameter of reaction site 104 and/or the thickness of the sample holder. For example, each reaction site 104 may have a volume that is less than or equal to 1 nanoliter, less than or equal to 100 picoliters, less than or equal to 30 picoliters, or less than or equal to 10 picoliters. In other embodiments, the volume some or all of the reaction sites 104 is in a range of 1 to 20 nanoliters.

In some embodiments, the reaction sites are through-holes. In these examples, each through-hole has a volume of about 1.3 nanoliters. Alternatively, the volume each through-hole may be less than 1.3 nanoliters. This may be achieved, for example, by decreasing the diameter of through-hole and/or the thickness of the sample holder consumable. For example, each through-hole may have a volume that is less than or equal to 1 nanoliter, less than or equal to 100 picoliters, less than or equal to 30 picoliters, or less than or equal to 10 picoliters. In other embodiments, the volume some or all of the through-holes is in a range of 1 to 20 nanoliters.

In various embodiments, a density of reaction sites 104 may be at least 100 reaction sites per square millimeter. In other embodiments, there may be higher densities of reaction sites. For example, a density of reaction sites 104 within chip 100 may be greater than or equal to 150 reaction sites per square millimeter, greater than or equal to 200 reaction sites per square millimeter, greater than or equal to 500 reaction sites per square millimeter, greater than or equal to 1,000 reaction sites per square millimeter, greater than or equal to 10,000 reaction sites per square millimeter.

In some embodiments, the reaction sites are through-holes. Accordingly, a density of through-holes within a sample holder consumable may be greater than or equal to 150 through-holes per square millimeter, greater than or equal to 200 through-holes per square millimeter, greater than or equal to 500 through-holes per square millimeter, greater than or equal to 1,000 through-holes per square millimeter, greater than or equal to 10,000 through-holes per square millimeter.

Referring to FIG. 1, in certain embodiments of the present invention, a consumable, an article, chip, device, substrate, slide, or plate 100 comprises a substrate 102 containing a plurality of through-holes, reaction regions, or reaction sites 104 located in substrate 102. In certain embodiments, consumable 100 may comprise an article. Additionally or alternatively, consumable 100 may comprise a microfluidic device which, for example, may further include a plurality of channels or paths for transferring reagents and/or test solutions to reaction sites 104. In other embodiments, reaction sites 104 comprise a plurality of droplets or beads and consumable 100 may comprise one or more chambers and/or channels containing some or all of the droplets or beads 104. In such embodiments, droplets or beads 104 may form an emulsion, where some or all of droplets or beads 104 contain one or more target of at least one polynucleotide or nucleotide sequence. Where reaction sites 104 are beads, the beams may optionally include an attached optical signature or label. Droplets or beams 104 may be inspected, monitored, or measured either one at time or in groups containing one or more droplets or beads 104, for example using an imaging system according to embodiments of the present invention.

Reaction sites 104 may include reaction volumes located within through-holes, wells or indentations formed in substrate 102, spots of solution distributed on the surface 110, or other types of reaction chambers or formats, such as samples or solutions located within test sites or volumes of a microfluidic system, or within or on small beads or spheres.

Reaction sites 104 may be configured to provide sufficient surface tension by capillary action to draw in respective amounts of liquid or sample containing a biological components of interest. Consumable 100 may have a general form or construction as disclosed in any of U.S. Pat. No. 6,306,578; 7,332,271; 7,604,983; 7,6825,65; 6,387,331; or 6,893,877, which are herein incorporated by reference in their entirety as if fully set forth herein. Substrate 102 may be a flat plate or comprise any form suitable for a particular application, assay, or experiment. Substrate 102 may comprise any of the various materials known in the fabrication arts including, but not limited to, a metal, glass, ceramic, silicon, or the like. Additionally or alternatively, substrate 102 may comprise a polymer material such as an acrylic, styrene, polyethylene, polycarbonate, and polypropylene material. Substrate 102 and reaction sites 104 may be formed by one or more of machining, injection molding, hot embossing, laser drilling, photolithography, or the like.

In certain embodiments, surface 110 may comprise a hydrophobic material, for example, as described in US Patent Application Publication Numbers 2006/0057209 or 2006/0105453, which are herein incorporated by reference in their entirety as if fully set forth herein. In such embodiments, reaction sites 104 may comprise a hydrophilic material that attracts water or other liquid solutions. An array of such hydrophilic regions may comprise hydrophilic islands on a hydrophobic surface and may be formed on or within substrate 102 using any of various micro-fabrication techniques including, but are not limited to, depositions, plasmas, masking methods, transfer printing, screen printing, spotting, or the like.

Consumable 100 may also include an identifier 118. In this example, identifier 118 is an alpha-numeric sequence. However, it should be recognized that an identifier may be another type of symbol or characters according to various embodiments described herein. Identifier 118 may be, for example, a barcode, a QR code, a symbol, a numeric sequence, an RFID identifier, or an alpha sequence. Furthermore, although identifier 118 is shown in the bottom right corner of consumable 100, identifier 118 may be located in any position on the consumable as long as the position is known and stored in memory of the system according to various embodiments described in this document.

Computer-Implemented System

Methods of detection and processing of identifiers in accordance with embodiments described herein, may be implemented in a computer system.

Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on non-transitory computer-readable media. Some other processes can be implemented using analog circuitry, as is well known to one of ordinary skill in the art. Additionally, memory or other storage, as well as communication components, may be employed in embodiments of the invention.

Figure 2:
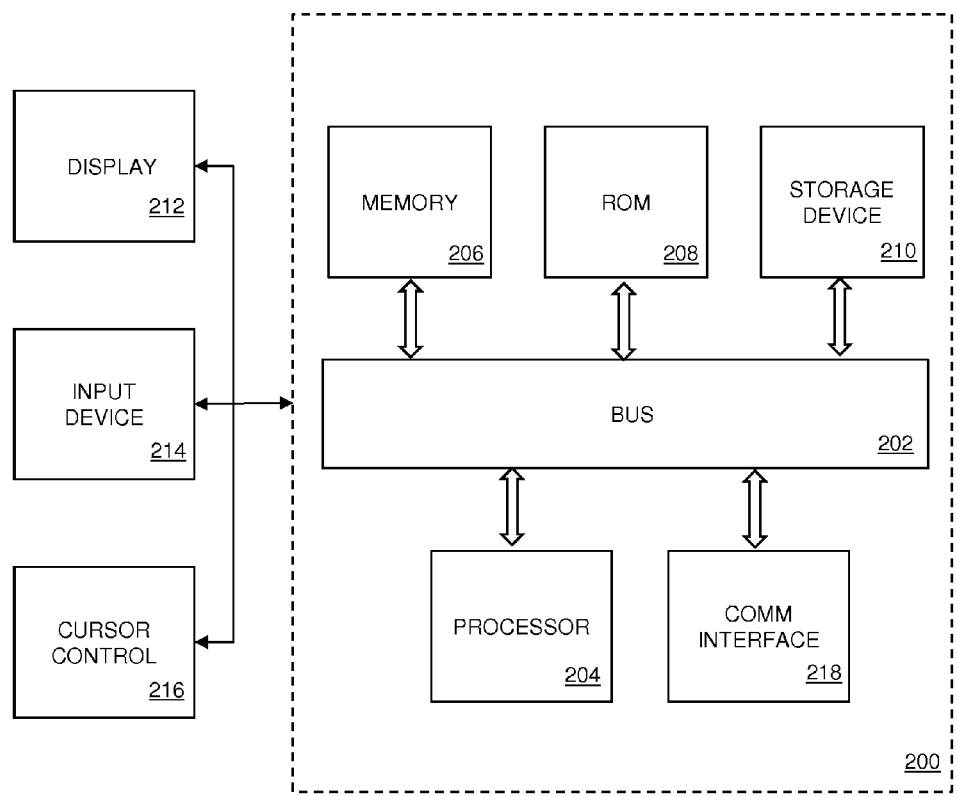
FIG. 2 is a block diagram that illustrates a computer system, upon which embodiments of the present teachings may be implemented.

FIG. 2 is a block diagram that illustrates a computer system 200 that may be employed to carry out processing functionality, according to various embodiments. Instruments to perform experiments may be connected to the exemplary computing system 200. According to various embodiments, the instruments that may be utilized are a thermal cycler system 200 of FIG. 2 or a thermal cycler system 300 of FIG. 3 may utilize. Computing system 200 can include one or more processors, such as a processor 204. Processor 204 can be implemented using a general or special purpose processing engine such as, for example, a microprocessor, controller or other control logic. In this example, processor 204 is connected to a bus 202 or other communication medium.

Further, it should be appreciated that a computing system 200 of FIG. 2 may be embodied in any of a number of forms, such as a rack-mounted computer, mainframe, supercomputer, server, client, a desktop computer, a laptop computer, a tablet computer, hand-held computing device (e.g., PDA, cell phone, smart phone, palmtop, etc.), cluster grid, netbook, embedded systems, or any other type of special or general purpose computing device as may be desirable or appropriate for a given application or environment. Additionally, a computing system 200 can include a conventional network system including a client/server environment and one or more database servers, or integration with LIS/LIMS infrastructure. A number of conventional network systems, including a local area network (LAN) or a wide area network (WAN), and including wireless and/or wired components, are known in the art. Additionally, client/server environments, database servers, and networks are well documented in the art. According to various embodiments described herein, computing system 200 may be configured to connect to one or more servers in a distributed network. Computing system 200 may receive information or updates from the distributed network. Computing system 200 may also transmit information to be stored within the distributed network that may be accessed by other clients connected to the distributed network.

Computing system 200 may include bus 202 or other communication mechanism for communicating information, and processor 204 coupled with bus 202 for processing information.

Computing system 200 also includes a memory 206, which can be a random access memory (RAM) or other dynamic memory, coupled to bus 202 for storing instructions to be executed by processor 204. Memory 206 also may be used for storing temporary variables or other intermediate information during execution of instructions to be executed by processor 204. Computing system 200 further includes a read only memory (ROM) 208 or other static storage device coupled to bus 202 for storing static information and instructions for processor 204.

Computing system 200 may also include a storage device 210, such as a magnetic disk, optical disk, or solid state drive (SSD) is provided and coupled to bus 202 for storing information and instructions. Storage device 210 may include a media drive and a removable storage interface. A media drive may include a drive or other mechanism to support fixed or removable storage media, such as a hard disk drive, a floppy disk drive, a magnetic tape drive, an optical disk drive, a CD or DVD drive (R or RW), flash drive, or other removable or fixed media drive. As these examples illustrate, the storage media may include a computer-readable storage medium having stored therein particular computer software, instructions, or data.

In alternative embodiments, storage device 210 may include other similar instrumentalities for allowing computer programs or other instructions or data to be loaded into computing system 200. Such instrumentalities may include, for example, a removable storage unit and an interface, such as a program cartridge and cartridge interface, a removable memory (for example, a flash memory or other removable memory module) and memory slot, and other removable storage units and interfaces that allow software and data to be transferred from the storage device 210 to computing system 200.

Computing system 200 can also include a communications interface 218. Communications interface 218 can be used to allow software and data to be transferred between computing system 200 and external devices. Examples of communications interface 218 can include a modem, a network interface (such as an Ethernet or other NIC card), a communications port (such as for example, a USB port, a RS-232C serial port), a PCMCIA slot and card, Bluetooth, etc. Software and data transferred via communications interface 218 are in the form of signals which can be electronic, electromagnetic, optical or other signals capable of being received by communications interface 218. These signals may be transmitted and received by communications interface 218 via a channel such as a wireless medium, wire or cable, fiber optics, or other communications medium. Some examples of a channel include a phone line, a cellular phone link, an RF link, a network interface, a local or wide area network, and other communications channels.

Computing system 200 may be coupled via bus 202 to a display 212, such as a cathode ray tube (CRT) or liquid crystal display (LCD), for displaying information to a computer user. An input device 214, including alphanumeric and other keys, is coupled to bus 202 for communicating information and command selections to processor 204, for example. An input device may also be a display, such as an LCD display, configured with touchscreen input capabilities. Another type of user input device is cursor control 216, such as a mouse, a trackball or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane. A computing system 200 provides data processing and provides a level of confidence for such data. Consistent with certain implementations of embodiments of the present teachings, data processing and confidence values are provided by computing system 200 in response to processor 204 executing one or more sequences of one or more instructions contained in memory 206. Such instructions may be read into memory 206 from another computer-readable medium, such as storage device 210. Execution of the sequences of instructions contained in memory 206 causes processor 204 to perform the process states described herein. Alternatively hard-wired circuitry may be used in place of or in combination with software instructions to implement embodiments of the present teachings. Thus implementations of embodiments of the present teachings are not limited to any specific combination of hardware circuitry and software.

The term "computer-readable medium" and "computer program product" as used herein generally refers to any media that is involved in providing one or more sequences or one or more instructions to processor 204 for execution. Such instructions, generally referred to as "computer program code" (which may be grouped in the form of computer programs or other groupings), when executed, enable the computing system 200 to perform features or functions of embodiments of the present invention. These and other forms of non-transitory computer-readable media may take many forms, including but not limited to, non-volatile media, volatile media, and transmission media. Non-volatile media includes, for example, solid state, optical or magnetic disks, such as storage device 210. Volatile media includes dynamic memory, such as memory 206. Transmission media includes coaxial cables, copper wire, and fiber optics, including the wires that comprise bus 202.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on magnetic disk of a remote computer. The remote computer can load the instructions into its dynamic memory and send the instructions over a telephone line using a modem. A modem local to computing system 200 can receive the data on the telephone line and use an infra-red transmitter to convert the data to an infra-red signal. An infra-red detector coupled to bus 202 can receive the data carried in the infra-red signal and place the data on bus 202. Bus 202 carries the data to memory 206, from which processor 204 retrieves and executes the instructions. The instructions received by memory 206 may optionally be stored on storage device 210 either before or after execution by processor 204.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

PCR Instruments

Figure 3:
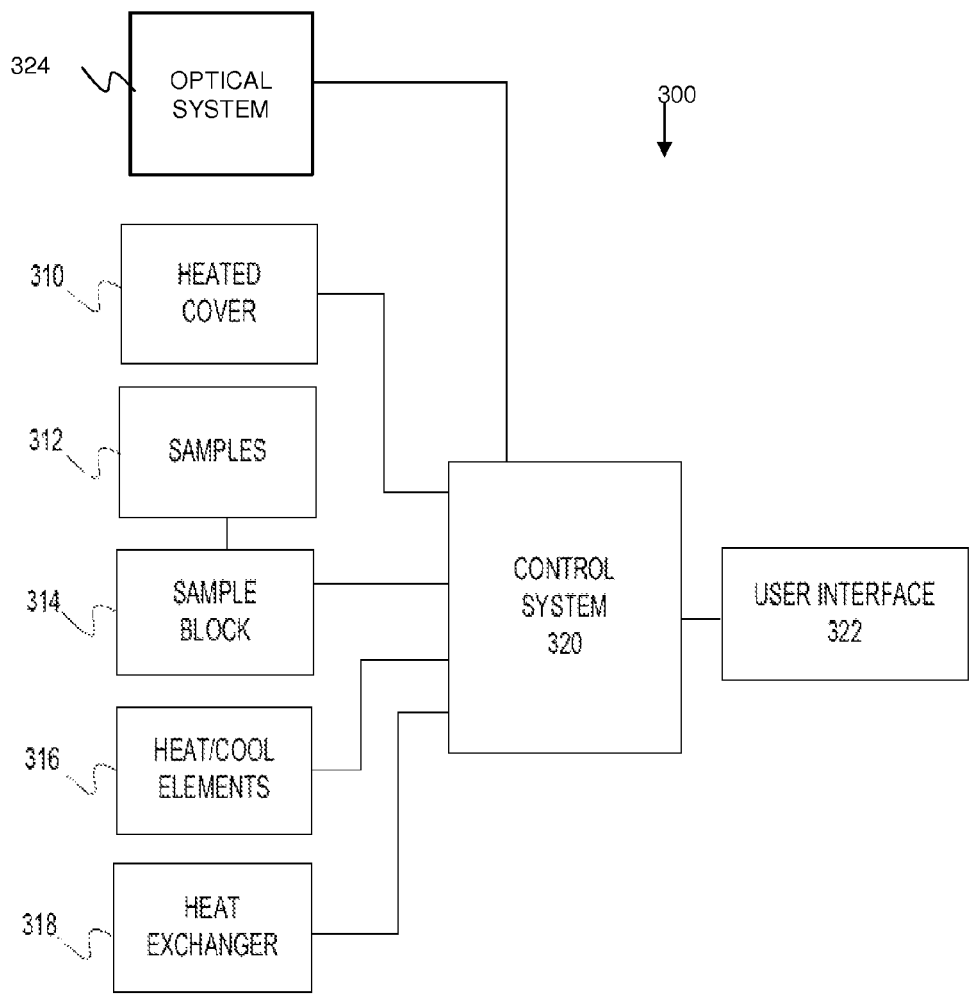
FIG. 3 is a block diagram that illustrates an exemplary instrument, upon which embodiments of the present teachings may be implemented.

As mentioned above, an instrument that may be utilized according to various embodiments, but is not limited to, is a polymerase chain reaction (PCR) instrument. FIG. 3 is a block diagram that illustrates a PCR instrument 300, upon which embodiments of the present teachings may be implemented. PCR instrument 300 may include a heated cover 310 that is placed over a plurality of samples 312 contained in a consumable (not shown). In various embodiments, a consumable may be a glass or plastic slide with a plurality of sample regions, which sample regions have a cover between the sample regions and heated cover 310. Some examples of a consumable may include, but are not limited to, a multi-well plate, such as a standard microtiter 96-well, a 384-well plate, or a microcard, or a substantially planar support, such as a glass or plastic slide. The reaction sites in various embodiments of a consumable may include depressions, indentations, ridges, and combinations thereof, patterned in regular or irregular arrays formed on the surface of the consumable. Various embodiments of PCR instruments include a sample block 314, elements for heating and cooling 316, a heat exchanger 318, control system 320, and user interface 322. Various embodiments of a thermal block assembly according to the present teachings comprise components 314-318 of PCR instrument 300 of FIG. 3.

Real-time PCR instrument 300 has an optical system 324. In FIG. 3, an optical system 324 may have an illumination source (not shown) that emits electromagnetic energy, an optical sensor, detector, or imager (not shown), for receiving electromagnetic energy from samples 312 in a consumable, and optics 340 used to guide the electromagnetic energy from each DNA sample to the imager. For embodiments of PCR instrument 300 in FIG. 3 and real-time PCR instrument 300 in FIG. 3, control system 320, may be used to control the functions of the detection system, heated cover, and thermal block assembly. Control system 320 may be accessible to an end user through user interface 322 of PCR instrument 300 in FIG. 3 and real-time PCR instrument 300 in FIG. 3. Also a computer system 200, as depicted in FIG. 2, may serve as to provide the control the function of PCR instrument 300 in FIG. 3, as well as the user interface function. Additionally, computer system 200 of FIG. 2 may provide data processing, display and report preparation functions. All such instrument control functions may be dedicated locally to the PCR instrument, or computer system 200 of FIG. 2 may provide remote control of part or all of the control, analysis, and reporting functions, as will be discussed in more detail subsequently.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Optical System for Imaging

Figure 4:
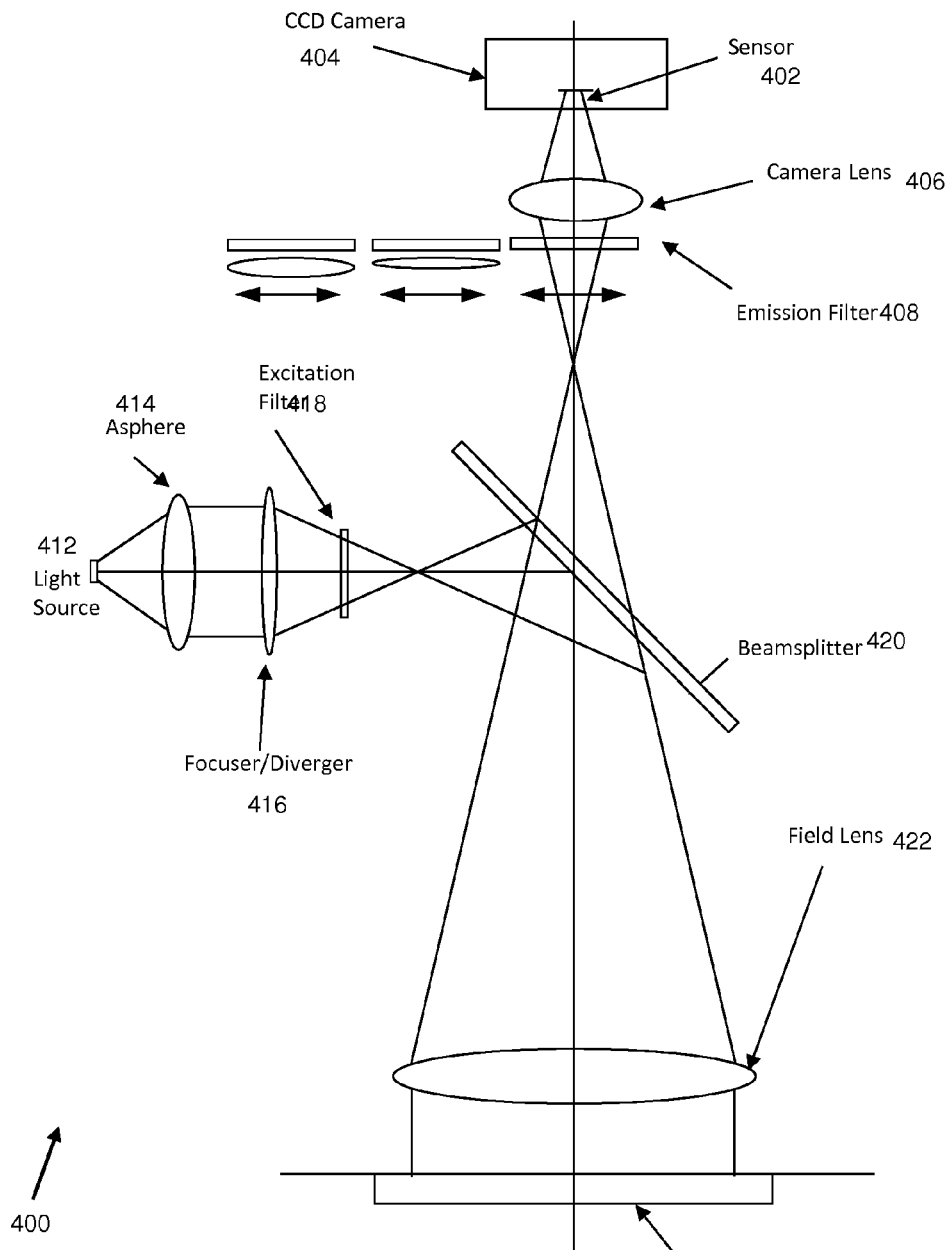
FIG. 4 illustrates an exemplary optical system for imaging according to various embodiments described herein.

FIG. 4 depicts an exemplary optical system 400 that may be used for imaging according to embodiments described herein. It should be recognized that optical system 400 is an exemplary optical system and one skilled in the art would recognize that other optical systems may be used to image an object-of-interest. According to various embodiments, an object of interest may be a consumable as described herein. An optical sensor 402 included in a camera 404, for example, may image an object-of-interest 410. Object-of-interest may be an array chip, a plurality of array chips, or a consumable including the sample for assaying, for example. The optical sensor 402 may be a CCD sensor and the camera 404 may be a CCD camera. Further, the optical sensor includes a camera lens 406.

Depending on the object of interest, an emission filter 408 is chosen for imagining the object-of-interest 410 according to various embodiments. Emission filter 408 may be changed to image fluorescent emission emitted from the object-of-interest 401 in other embodiments.

Optical system 400 may use a reflected light source 412 to image object-of-interest 410. The light from light source 412 may be filtered through an asphere 414, a focuser/diverger 416, and excitation filter 418 before being reflected to the object-of-interest 410 by beamsplitter 420. Optical system 400 may also include a field lens 422.

Image

Figure 5:
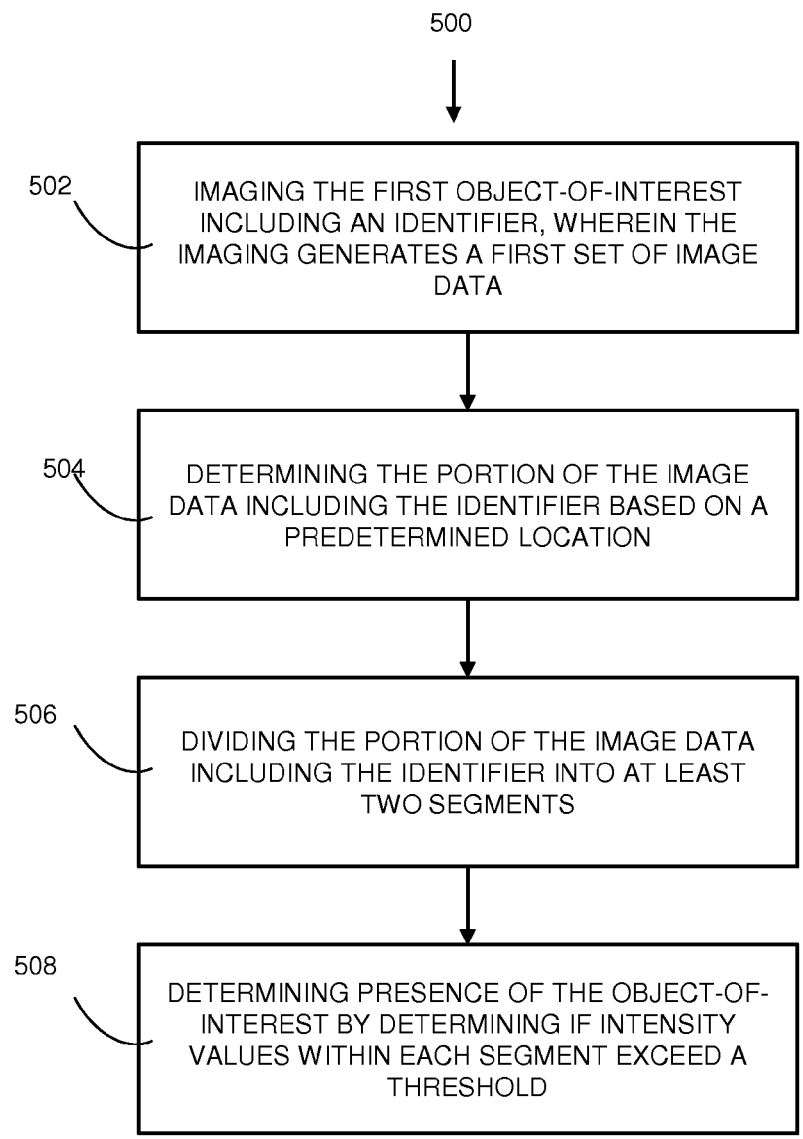
FIG. 5 illustrates a flowchart of a method for detecting the presence of a consumable in a system according to various embodiments described herein.

A method of detecting the presence of a consumable loaded into a system according to various embodiments described herein is illustrated in exemplary flowchart 500 of FIG. 5.

Figure 6:
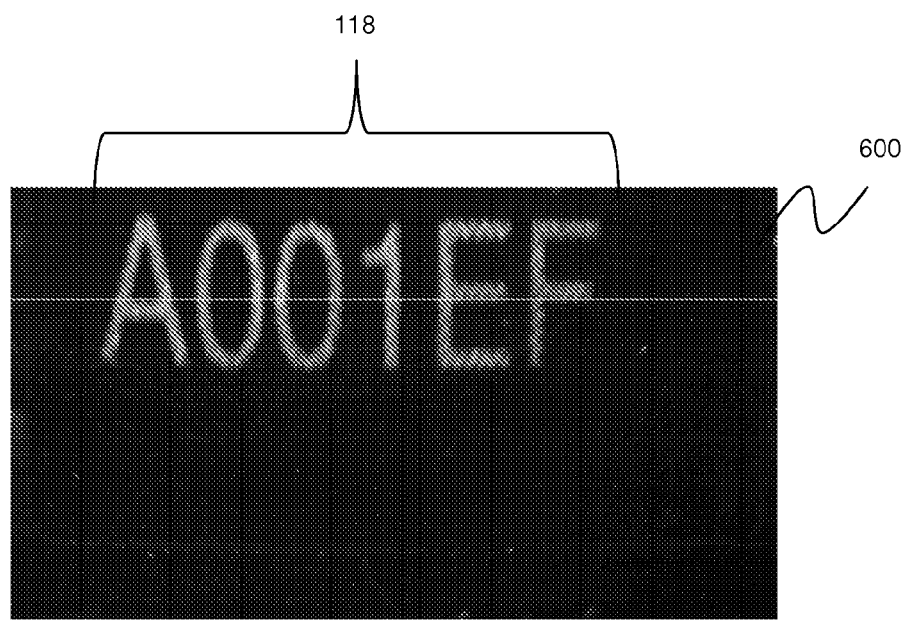
FIG. 6 illustrates an identifier according to various embodiments described herein.

As described above, optical system 400 as depicted in FIG. 4, may image an object-of-interest, as in step 502. The object-of-interest may be a consumable, such as a chip. As mentioned above, the object-of-interest may include an identifier 118. Based on an expected position of identifier 118 within the image, the portion of the image data including the image of the identifier may be determined, as in step 504. In other words, if a properly loaded consumable is within the system, knowing the dimensions of the expected consumable, the identifier 118 is expected to be within the image at a certain position. An example of an image of identifier 118 is shown in FIG. 6.

Figure 7:
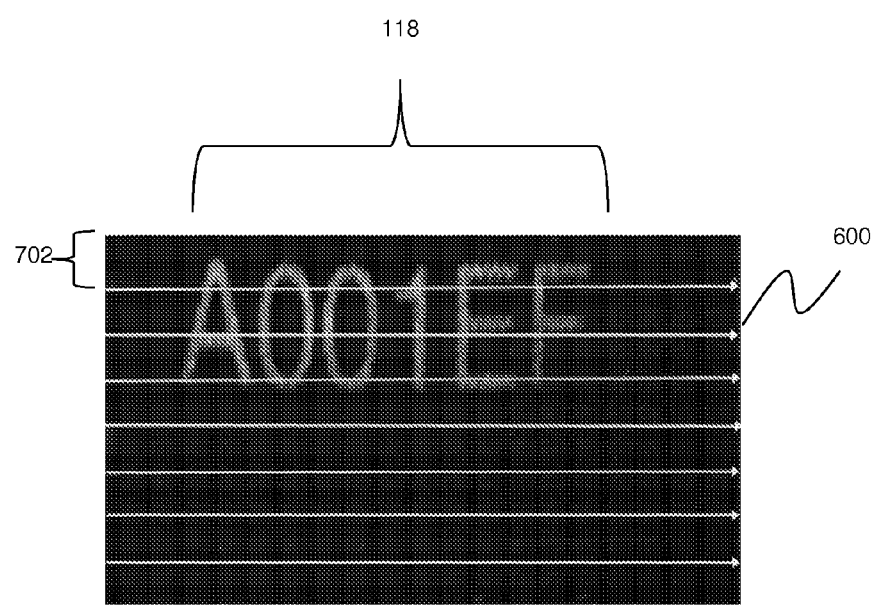
FIG. 7 illustrates dividing the identifier image into segments according to various embodiments described herein.

With reference back to FIG. 5, in step 506, the image portion 600 including identifier 118 is divided into a plurality of segments for further analysis. By dividing the image into a plurality of segments, time and resources needed to detect the presence in the system may be reduced. An image portion including identifier 118 divided into a plurality of segments 702 is shown in FIG. 7. In the example show in FIG. 7, the image portion 600 is divided into 8 segments 702. However, it should be recognized that an image portion 600 may be divided into as few as two segments.

With reference back to FIG. 5, in step 508, the presence of a consumable is determined if intensity values within at least one segment of the image portion exceed a threshold. In various embodiments, only one row of pixels extending the length of each segment is analyzed. If at least one row of pixels exceeds a threshold of intensity, it may be confirmed that the identifier is present in the image portion where identifier 118 is expected. As such, the consumable can be confirmed to be loaded into the system and the system may allow initiation of process that is run on the system.

A run may include a workflow as follows:
1. Upon the tray closing, an image is captured from the optical detector for purposes of consumable presence detection and subsequent consumable identification
2. Presence of consumable material is quickly established using a method according embodiments described herein.
3. Upon detecting presence of a consumable, more rigorous analysis is performed in order to establish identity of consumable material using Optical Character Recognition, Barcode analysis, or similar schemes.
   a. If identification is successful, the resulting identity is presented to a human operator for verification
   b. Whether or not identification is successful, the human operator may initiate image acquisition and primary analysis of consumable.

According to various embodiments of the present teaching, the method for establishing the absence or presence of a labeled consumable material in an instrument based on an optical image includes using an identifier on a consumable that is positioned within the active imaging area within an instrument. The consumable is positioned such that it is mostly or entirely within the imaging area. The identifier includes optical characteristics that are representative of an identification code, for instance, human readable text or barcode, where the identifier is printed. According to various embodiments there is a minimum level of contrast between signal reflected from the label background ("B") and signal reflected from the identifier ("F") within the color band (optical wavelength) of the detector.

Figure 8:
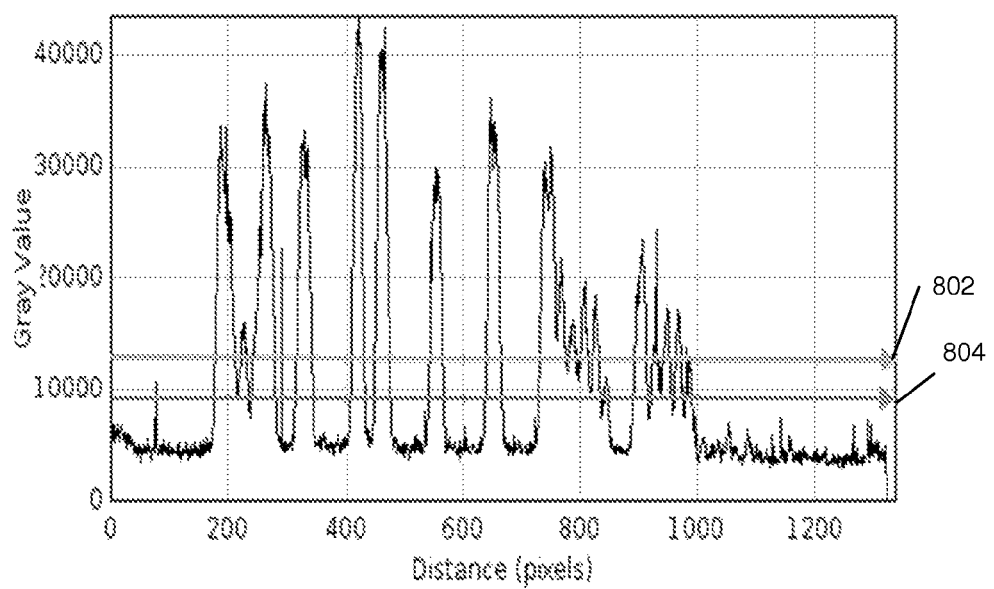
FIG. 8 illustrates an intensity plot across a segment according to various embodiment described herein.

In some embodiments, the identifier has a consistent orientation. In one example, the alphanumeric characters are in a vertical orientation. The method includes extracting signal values, such as intensity values, from each of a low number (5-15) of evenly spaced, one-dimensional slices from the image corresponding to the orientation of the label ("rows" or "columns"). Within each list of signal values, two signal thresholds are determined and used to distinguish the foreground (the identifier) from the background. With reference to FIG. 8, the lower threshold 804 is determined by nominally averaging the signal in the list. An upper threshold 802 is determined by nominally averaging the brightest ⅔ signal values in the list.

Iterating over the values in the list, a flag is included for data indicating whether printed text is detected. The flag is set once the signal is higher than the upper threshold 802, and cleared once it goes below the lower threshold 804. If the flag remains set for a certain number of successive signal values in the list (nominally between 20 and 80 pixels, depending on the font size or line width and resolution of the optical detector), a "peak" count is incremented by one. If a list contains more than a certain number of "peaks" (nominally 5 or 6, depending on the number of characters in the label and overall label dimensions), a consumable is deemed present. If having iterated over all slices of the acquired image no slice contains the required number of peaks, the consumable material is deemed absent.

Although the present invention has been described with respect to certain exemplary embodiments, examples, and applications, it will be apparent to those skilled in the art that various modifications and changes may be made without departing from the invention.

What is claimed is:

1. A computer-implemented method for detecting a presence of a sample holder in a biological analysis system comprising an optical detector configured to detect signals from biological reactions occurring in the sample holder, the method comprising:
   imaging the sample holder including an identifier on the sample holder, wherein the imaging generates image data;
   determining a portion of the image data including the identifier based on the image data corresponding to a predetermined location of the imaged sample holder;
   dividing the portion of the image data including the identifier into at least two segments of pixels, each of the at least two segments including differing pixels;
   extracting, for each of the at least two segments, intensity values from the pixels in each of the at least two segments;
   comparing, for each of the at least two segments, the intensity values of the pixels to intensity threshold values;
   verifying a presence of the sample holder when the comparison identifies a number of related intensity values that exceeds a presence threshold for at least one of the at least two segments; and
   in response to verifying the presence, initiating a biological sample analysis procedure using the biological analysis system.

2. The computer-implemented method of claim 1, further comprising:
   calculating, for each of the at least two segments, the intensity threshold values from the intensity values of the pixels, wherein the intensity threshold values include a lower threshold indicating background data and an upper threshold indicating identifier data.

3. The computer-implemented method of claim 2, wherein the comparison of the intensity values for each of the at least two segments, comprises:
   iteratively comparing the intensity values of the pixels to the lower threshold and the upper threshold.

4. The computer-implemented method of claim 3, wherein determining the comparison for each of the at least two segments, comprises:
   setting a flag when an intensity value of a pixel exceeds the upper threshold; and
   incrementing a counter when a number of successive intensity values of successive pixels compared after setting the flag exceeds the lower threshold, wherein the counter indicates the number of related intensity values.

5. The computer-implemented method of claim 4, wherein the sample holder is verified as present if the counter indicates at least 4 related intensity values for at least one of the at least two segments.

6. The computer-implemented method of claim 2, wherein the lower threshold, for each of the at least two segments, is determined by averaging the intensity values, and the upper threshold, for each of the at least two segments, is determined by averaging a brightest ⅔ of intensity values.

7. The computer-implemented method of claim 1, wherein the extracting comprises extracting intensity values from pixels arranged in a one-dimensional array.

8. A system for detecting a presence of a sample holder in a biological analysis system, the system comprising:
   an optical detector configured to image the sample holder including an identifier on the sample holder, wherein the imaging generates image data; and
   a processor configured to:
      determine a portion of the image data including the identifier based on the image data corresponding to a predetermined location of the imaged sample holder;
      divide the portion of the image data including the identifier into at least two segments of pixels, each of the at least two segments including differing pixels;
      extract, for each of the at least two segments, intensity values from the pixels in each of the at least two segments;
      determine, for each of the at least two segments, a number of peaks based on a comparison of the intensity values of the pixels to intensity threshold values;
      verify a presence of the sample holder when the comparison identifies a number of related intensity values that exceeds a presence threshold for at least one of the at least two segments; and
      in response to verifying the presence, initiate a biological sample analysis procedure using the biological analysis system.

9. The system of claim 8, wherein the processor is further configured to:
   calculate, for each of the at least two segments, the intensity threshold values from the intensity values of the pixels, wherein the intensity threshold values include a lower threshold indicating background data and an upper threshold indicting identifier data.

10. The system of claim 9, wherein the comparison of the intensity values for each of the at least two segments, comprises:
    iteratively comparing the intensity values of the pixels to the lower threshold and the upper threshold.

11. The system of claim 10, wherein the comparison for each of the at least two segments, comprises:
    setting a flag when an intensity value of a pixel exceeds the upper threshold; and incrementing a counter when a number of successive intensity values of successive pixels compared after setting the flag exceeds the lower threshold, wherein the counter indicates the number of related intensity values.

12. The system of claim 11, wherein the sample holder is verified as present if the counter indicates at least 4 related intensity values for at least one of the at least two segments.

13. The system of claim 9, wherein the lower threshold, for each of the at least two segments, is determined by averaging the intensity values, and the upper threshold, for each of the at least two segments, is determined by averaging a brightest ⅔ of intensity values.

14. The system of claim 8, wherein the extracting comprises extracting intensity values from pixels arranged in a one-dimensional array.

15. A non-transitory computer-readable storage medium encoded with processor executable instructions, the instructions including instructions for:
- imaging a sample holder in a biological analysis system including an identifier on the sample holder, wherein the imaging generates image data;
- determining a portion of the image data including the identifier based on the image data corresponding to a predetermined location of the imaged sample holder;
- dividing the portion of the image data including the identifier into at least two segments of pixels, each of the at least two segments including differing pixels;
- extracting, for each of the at least two segments, intensity values from the pixels in each of the at least two segments;
- determining, for each of the at least two segments, a number of peaks based on a comparison of the intensity values of the pixels to intensity threshold values;
- verifying a presence of the sample holder when the comparison identifies a number of related intensity values that exceeds a presence threshold for at least one of the at least two segments; and
- in response to verifying the presence, initiating a biological sample analysis procedure using the biological analysis system.

16. The computer-readable storage medium of claim 15, the instructions further including instructions for:
- calculating, for each of the at least two segments, the intensity threshold values from the intensity values of the pixels, wherein the intensity threshold values include a lower threshold indicating background data and an upper threshold indicting identifier data.

17. The computer-readable storage medium of claim 16, wherein the comparison of the intensity values for each of the at least two segments, comprise instruction for:
- iteratively comparing the intensity values of the pixels to the lower threshold and the upper threshold.

18. The computer-readable storage medium of claim 17, wherein instructions for the comparing for each of the at least two segments, comprise instructions for:
- setting a flag when an intensity value of a pixel exceeds the upper threshold; and
- incrementing a counter when a number of successive intensity values of successive pixels compared after setting the flag exceeds the lower threshold, wherein the counter indicates the number of related intensity values.

19. The computer-readable storage medium of claim 18, wherein the sample holder is verified as present if the counter indicates at least 4 related intensity values for at least one of the at least two segments.

20. The computer-readable storage medium of claim 16, wherein the lower threshold, for each of the at least two segments, is determined by averaging the intensity values, and the upper threshold, for each of the at least two segments, is determined by averaging a brightest ⅔ of intensity values.

21. The computer-readable storage medium of claim 15, wherein the extracting comprises extracting intensity values from pixels arranged in a one-dimensional array.

\* \* \* \* \*